July 17, 1962 F. SCHNEIDER ETAL 3,045,110
MULTI-FLUX CONTINUOUS ELECTRODE
Filed May 2, 1960
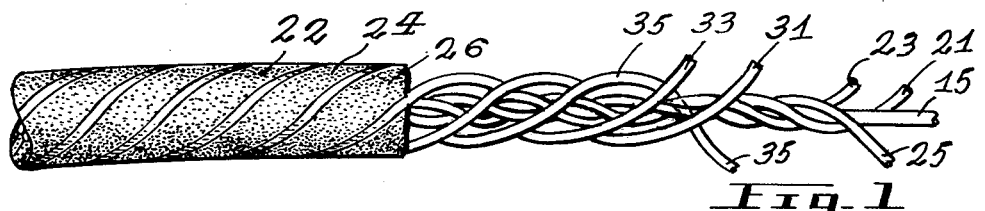
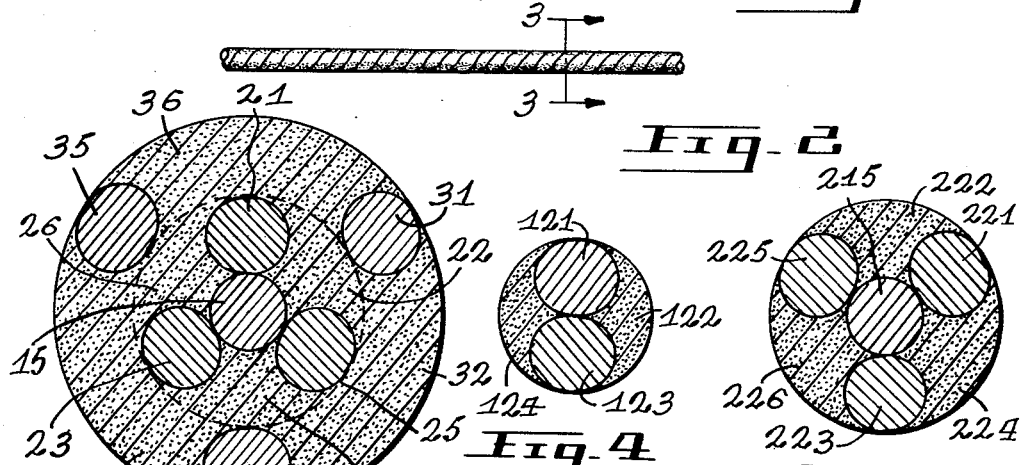
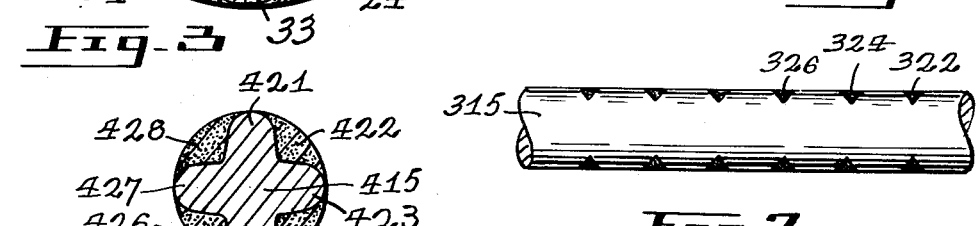
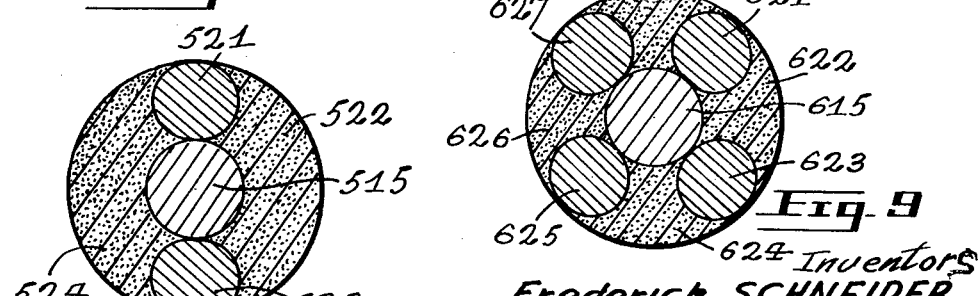
Inventors
Frederick SCHNEIDER
Lucien GIROUARD
By Alan Aub... 
Attorney

3,045,110
MULTI-FLUX CONTINUOUS ELECTRODE

Frederick Schneider, Beaconsfield, Quebec, and Lucien Girouard, Montreal, Quebec, Canada, assignors to L'Air Liquide, Societe Anonyme pour l'Etude et l'Exploitation des Procedes Georges Claude, Paris, France
Filed May 2, 1960, Ser. No. 26,047
Claims priority, application France May 4, 1959
9 Claims. (Cl. 219—146)

This invention relates to continuous electrodes and more particularly to continuous stranded electrodes.

Electrodes of the continuous stranded type are shown in the Volff and Savard United States Patent 2,849,593, August 26, 1958, in the Savard and Volff copending application S.N. 679,264, filed August 20, 1957, and in the Volff and Savard copending application S.N. 736,633, filed May 20, 1958, now Patent 2,938,108, dated May 24, 1960.

Continuous stranded electrodes of this general type employing small diameter core wires (say up to 0.080 inch) for flexibility and having a single flux have been successfully used for welding currents up to 350 amperes to provide sound quality welds with a tolerable amount of spatter. Using 4-strand and even 7-strand wires having a single coating, however, at currents above about 350 amperes the problems start to arise. One problem is that of a uniform weld quality. Another is excessive penetration and considerable overheating of the workpiece apparently caused by a jump in the arc voltage to well over 30 volts. It has been found almost impossible completely to eliminate weld porosity.

The present knowledge of flux composition for the conventional arc welding electrode calls for the certain requirements to be filled for proper arc action and obtaining the specified quality. These requirements are (a) electrical ionization, (b) deoxidation and refining of weld metal, (c) protection against atmospheric contamination with a slag, (d) production of a gaseous surrounding for protection of the arc stream, (e) conveying alloying elements. These functions are normally obtained by making up fluxes having a suitable average composition to meet the convention American Welding Society continuous electric welding electrode classifications. The art of welding is well acquainted with the fact that such materials are essential for obtaining good quality welds.

In making a continuous 7-stranded electrode using a single flux it has been found that the use of the conventional average composition of each group gives rise to a variable degree of improper arc action, excessive spatter and poor mechanical properties. The phenomenon is pronounced for the classification groups which contain a higher proportion of components which give off a gas on decomposition, for instance, cellulosic material or dissociable carbonates, and much less noticeable when materials of such unstable nature are absent or present in minute quantity.

APPLICANTS' DEVELOPMENT

The applicants have now developed an electrode in which the constituents of a normal electric welding flux of a type which can be employed on a continuous flexible electrode are separated into mutually heterogeneous inner and outer layers in such a manner as to avoid the problems of uniflux system in which a homogeneous flux is used throughout. According to the invention, the electrode is made up of a flexible carrier of welding metal which carries the flux which comprises gasifying materials which give off gas on decomposition in the arc, non-gasifying materials which do not give off gas on decomposition in the arc and optionally up to 50% of a slag-volume controlling agent. In accordance with the invention, the flux is divided into inner and outer layers, the inner layer being of a volatile-type flux including at least about 80% of the gasifying materials, the outer layer being of a mineral-type flux including at least about 90% of the non-gasifying materials. The slag-volume controlling agent which is preferably iron powder and an optional constituent can be contained in either layer or be distributed between the layers, i.e., there is up to 100% of the slag-volume controlling agent, if any, in either layer. In other words, either layer may contain up to 100% of the slag-volume controlling agent, the remainder, if any, being in the other layer.

The selection of a normal flux, preferably a flux of the American Welding Society standard classification, for example cellulosic, mineral, basic, or rutile flux, and of the constituents which appear in the inner layer and those which appear in the outer layer, will be clear to one skilled in the art. The gasifying materials are, for example cellulosic materials which dissociate into carbon monoxide and hydrogen gas, carbonates and oxalates which dissociate mainly into carbon monoxide and calcium fluoride which dissociates into florine gas. The remaining constituents of the flux are materials which do not gasify but merely melt to form a slag. Iron powder is an exception in that it may or may not be employed in the flux for the purposes of controlling the volume of the slag. In this respect it is a special constituent and not a normal constituent of an electric welding flux suitable for a continuous flexible electrode.

It could also be said that in the segregated multi-flux system of the invention, the gas-generating material of the inner core physically spreads or rather blows the arc stream which is a flow of electricity and magnifies the dimension of the electrical current more in its cross-section than in its length, thus creating a condition where the arc voltage can remain in the low range, whereas the current intensity can be increased to much higher limits, thus obtaining better decomposition rates and efficiencies without the inconvenience of the deep penetration. Decomposition rate is a function of current intensity rather than of arc voltage.

Among the inner constituents are cellulose, wood flour, soluble cellulose, carbonates of calcium, carbonates of magnesium carbonates of iron, carbonates of manganese and fluorspar (calcium fluoride). Among the outer constituents are silica flour, natural magnesium silicate, natural aluminum silicate, oxide of titanium, oxide of iron, oxide of manganese, refining alloys, iron powder, sodium silicate and potassium silicate.

The use of these two fluxes is made possible by a specially constructed electrode which has a metallic core, preferably a stranded core, carrying the gas-producing constituents and an external winding of several wires about the core and forming in the interstices between the wire and core pockets adapted to carry the non-gas-forming flux.

In a preferred method of making the electrode of the invention, the inner layer of flux is first extruded on to the core, the external winding wound over the core carrying the flux and a second extrusion performed in which the external layer of flux is applied.

A continuous stranded electrode of these characteristics is capable of excellent performance in welding at currents over 350 amperes with good weld quality and without excessive spatter or undue penetration or overheating of the workpiece. In addition, the electrode has the property of being effectively flexible for semi-automatic welding and of providing the slag protection of the outer coating as well as the gaseous shielding provided by the inner coating.

The invention will be further described by reference to preferred embodiments of it which are illustrated in the accompanying drawings, and in which:

FIGURE 1 is an enlarged view partly broken away to show the structural features of a length of continuous electrode according to the invention.

FIGURE 2 is a side view closer to actual size of the length of electrode according to the invention.

FIGURE 3 is an enlarged cross-section along the line 3—3 of FIGURE 2.

FIGURES 4, 5 and 6 are cross-sections through alternative forms of core according to the invention.

FIGURE 7 is a side elevation of a still further form of core according to the invention.

FIGURES 8 and 9 are cross-sections similar to FIGURE 3 through alternative forms of electrodes according to the invention showing different types of windings.

Referring more particularly to the drawings the electrode of FIGURE 1 is made up of an inner core having a central core wire 15 and three separate wires 21, 23 and 25 spirally twisted around the core wire 15 so as to present interstices or pockets between the wires which are filled with continuous ribbons of flux 22, 24 and 26. About this inner core is wrapped a winding of three wires 31, 33 and 35, again forming therebetween, and with the inner core, pockets containing continuous ribbons of flux 32, 34 and 36.

The inner cores shown in FIGURES 4 and 5 and the windings shown in FIGURES 8 and 9 are cores and windings similar in function to those of the electrode of FIGURE 1. Similar reference numerals have been given to the respective parts with the exception that they have been raised by one hundred over the numerals of FIGURE 1. For example, FIGURE 4 shows a core made up of a pair of helically wound wires 121 and 123. The interstices between the wires are filled with continuous flux ribbons 122 and 124. FIGURE 5 shows a core made up of a core wire 215 and helically wound around it, wires 221, 223 and 225. The pockets formed between the core wire 215 and the outer wires are filled by flux ribbons 222, 224 and 226.

FIGURE 6 illustrates a solid core 415 drawn to provide rands 421, 423, 425 and 427 and intervening grooves or flux pockets which are filled with flux ribbons 422, 424, 426 and 428.

Likewise FIGURE 7 indicates another type of solid core 315 which is knurled to provide flux pockets 322, 324, 326, etc.

FIGURE 8 shows a core made up of a core wire 515 and helically wound about it, outer wires 521 and 523; flux ribbons 522 and 524 are carried on the carrier thus formed. FIGURE 9 shows a core made up of a core wire 615 and outer wires 621, 623, 625 and 627. The carrier so formed carries in the interstices between the core and outer wires flux ribbons 622, 624, 626 and 628.

DETAILED CHARACTERISTICS
WIRES

The above description gives the fundamental construction of the continuous electrode but in order that it perform successfully certain other specifications are required.

For example, the wires should be of a size within the and are preferably circular in cross-section. A preferred range of diameter is from about 0.040 inch to about 0.045 inch. The preferred metal of the wires is standard mild steel electrode core wire, but the broader principles of the invention apply to wires made of other welding grade metal.

To provide the flexibility required for semi-automatic welding using a flexible casing leading to a welding gun a twisted wire core construction is most desirable. For completely automatic welding it would be possible to employ a solid core of the types shown or the equivalent capable of carrying at least 5% by weight of the consumable, combustible type gas-yielding coating.

The outer winding is made up of at least two wires wound at a pitch which can be extruded with a coating of at least 10% by weight. The three-wire outer coating is a preferred construction.

Flux

In the applicants' multi-flux system, the coating constituents have been segregated, with those subjected to decomposition and which contribute to erratic arc condition i.e., the gas formers in the inner coating, and those contributing to arc stability in the outer coating. In this manner the adverse arc characteristics of the inner coating constituents are controlled or nullified. Generally speaking, this multi-flux system can be applied to any of the conventional electrode coatings which can be grouped as follows: cellulosic, mineral, rutile or basic type coatings. Some of these coating constituents are sensitive to the arc heat and decompose in a violent and explosive manner generally contributing to weld spatter and erratic arc conditions. These constituents are generally of the gas-forming type, that is on decomposition they evolve a gas. Other coating constituents will have a more stabilizing effect on the arc characteristics. This type of constituent generally does not decompose in the arc and is generally considered as a slag-forming material. In the uniflux system the effects of the various constituents are blended and are roughly proportionate to their concentration. In accordance with the invention, the constituents of the coating are segregated into inner and outer layers as has been described.

It is also important that the characteristics and proportion of the flux to the metal part of the electrode be properly selected. For the inner core the proportion of flux to the welding wire may range from about 8% to about 16% by weight. A preferred range is from about 8% to about 14%. The amount of flux in terms of volume may be up to about 50% of the metal with the two-wire and up to about 30% for the three-wire electrode.

A preferred coating for the inner core may be basically of a consumable cellulosic type which is capable of giving off gas for protection of the weld. This inner flux may contain iron powder in amounts up to 50% by weight. The function of the cellulosic coating of the inner core is to provide basically a gaseous protection for the weld metal and in conjunction with the outer layer coating, and to provide a low voltage arc.

For the outer layer, the proportion of flux to the outer layer welding wire may range from about 20% to about 50% by weight. A preferred range is from about 30% to about 45%. The amount of flux by volume of the outer wires may be up to about 75%.

The coating used for the outer layer may be predominantly of the rutile type. As the volume of flux in proportion of the welding wire is high, iron powder may be added to the outer layer coating in amounts as stated elsewhere. The fundamental function of the outer coating is to provide a slag-type protection of the weld metal and in conjunction with the inner core coating provide a low voltage arc. The densities of the fluxes or coating after extrusion would range between 1.5 to 2.7.

Examples of specific types of flux which can be employed as the flux content of the electrode are shown in Tables 1 and 2. In accordance with the invention the constituents of each type of flux are segregated into inner and outer layers in accordance with the principles elucidated above. The constituents which are placed in the respective layers have been so identified. The amounts are percentages by weight of the total flux.

TABLE 1

| American Welding Society Classification | Cellulosic | | Mineral E 6020 | Mineral E 6027 |
|---|---|---|---|---|
| | E 6010 | E 6011 | | |
| Silica Flour (O) | | | 5-15 | 5-15. |
| Natural Magnesium Silicate (O). | 15-30 | 15-25 | up to 10 | up to 10. |
| Natural Aluminum Silicate (O). | | | up to 10 | up to 10. |
| Oxide of Titanium (O) | 15-30 | 15-30 | 5-15 | up to 5. |
| Oxide of Iron (O) | | | 5-15 | 15-25. |
| Oxide of Manganese (O) | | | 5-20 | 10-20. |
| Cellulose: | | | | |
| (a) Wood Flour (I) | 20-35 | 20-30 | up to 5 | up to 3. |
| (b) Soluble (I) | 2-5 | | up to 2 | up to 2. |
| Carbonates of Calcium (I) | | | 5-12 | 5-10. |
| Carbonates of Magnesium (I). | | | up to 5 | up to 5. |
| Carbonates of Iron (I) | | | up to 10 | up to 10. |
| Carbonates of Manganese (I) | | | up to 15 | up to 10. |
| Refining Alloys (O) | 7-15 | 7-15 | 10-20 | 5-15. |
| Iron Powder (O and I) | | | | 30-50. |
| Sodium Silicate (O and I) | 35-45 | | | up to 25. |
| Potassium Silicate (O and I) | | 30-40 | 20-30 | up to 25. |
| Fluorspar (I) | | | | |

(O) = outer layer.
(I) = inner layer.

TABLE 2

| American W.S. Classification | Rutile | | | | Basic E 6018 |
|---|---|---|---|---|---|
| | E 6012 | E 6013 | E 6014 | E 6024 | |
| Silica Flour (O) | up to 5 | up to 5 | up to 5 | 5-15 | |
| Natural Magnesium Silicate (O). | 5-10 | 5-10 | up to 10 | | |
| Natural Aluminum Silicate (O). | 10-20 | 5-10 | 5-10 | 5-15 | |
| Oxide of Titanium (O). | 30-40 | 15-30 | 15-30 | 10-25 | up to 7. |
| Oxide of Iron (O) | | | | | |
| Oxide of Manganese (O). | | | | | |
| Cellulose: | | | | | |
| (a) Wood Flour (I). | 2-8 | 10-20 | 5-15 | | up to 5 |
| (b) Soluble (I) | | | | | up to 2 |
| Carbonates of Calcium (I). | up to 10 | up to 10 | up to 5 | | 20-30. |
| Carbonates of Magnesium (I). | | | up to 5 | | |
| Carbonates of Iron (I). | | | | | |
| Carbonates of Manganese (I). | | | | | |
| Refining Alloys (O). | 5-15 | 5-15 | 5-15 | 5-15 | 5-10. |
| Iron Powder (O and I). | | | 10-25 | 25-35 | 20-30. |
| Sodium Silicate (O and I). | 10-20 | 5-10 | 7-15 | up to 25 | up to 20. |
| Potassium Silicate (O and I). | 10-20 | 15-25 | 7-15 | up to 25 | up to 20. |
| Fluorspar (I) | | | | | 15-30. |

(O) = outer layer.
(I) = inner layer.

Each of the constituents has been identified with the symbol "O" or "I" meaning outer or inner. Each of the materials noted "I" will predominantly appear in the inner layer of flux, since these are gas-forming materials. The materials identified with "O" alone are not gas-forming materials, but usually slag formers and will appear in the outer layer. The sodium potassium silicates are binders which may appear in both outer and inner layers. The iron powder is a supplement to the normal flux which may appear in either the outer or the inner layer. For the purposes of the present invention, the important aspect is that, when the total flux which is to be used is decided upon, at least eighty percent of its gas-forming constituents, preferably ninety percent or more, and usually ninety-five percent or more, are placed in the inner layer. The balance of the gas formers, if any, is placed in the outer layer. At least 90% of the non-gas forming constituents will be placed in the outer layer. This does not include the iron powder, which is a special supplementary material and which may appear in either layer.

The manufacturing procedure is similar to that employed in, for example, United States Patent 2,849,593 namely (a) Twisting of bare inner core.
(b) Coating of inner core by extrusion.
(c) Twisting of bare outer layer wires.
(d) Coating of outer layer by extrusion.
(e) Setting.
(f) Spooling.

In the stranding operation, the wire is passed through a die which produces a 5% reduction in total diameter in order to seat the peripheral wires on the center core. This is desirable to eliminate any possible disturbance of the wire pitch during subsequent processing. Extrusion pressures will vary between about 100 and about 300 p.s.i. The setting temperature of the multi-flux will vary between 200 to 600° F. For some of the multi-flux wires it may be necessary to heat the inner coating prior to application of the outer coating followed by a second heating operation. In the setting operation the wires are heated at moderate temperatures, for example in the case of rutile and mineral type coatings to about 200° F. to 300° F., and for lime ferritic type coatings up to about 500° F. to about 600° F. The physical characteristics of the fluxes (or slag) as deposited will be very similar to that obtained with standard electrodes of the same coating type. On drying, the flux is keyed to the wires.

In use, the multi-flux system of the invention results in a much more stable and a lower voltage arc than if the inner and outer coatings were mixed and applied as a homogeneous single coating. The applicants have observed with a given multi-flux wire that the arc voltage is at least 5 volts lower than for the single flux type coating. The capability of the multi-flux electrodes in terms of voltage and amperage varies for each type of multi-flux coating and also for each size of wire. The electrodes of the invention are flexible and can be flexed to a diameter of about 6 inches without producing any coating failure. The multi-flux electrodes are used similarly to uniflux electrodes. The welds obtained have been found to be excellent. The physical properties and decomposition rates will vary for each type of coating and each wire size.

The invention will be further described by reference to the accompanying example which illustrates specific preferred aspects of the invention not to be considered in a limiting sense.

EXAMPLE

An electrode was manufactured according to the following specification.

Inner core:
　Wires—4 strands of 0.040 inch diameter.
　Pitch of wires—1.85 times total diameter of inner core.
　Coating—cellulosic flux of the type described below.
Outer layer:
　Wires—3 strands of 0.040 inch diameter.
　Pitch of outer wires—1.0 times total diameter of wire.
　Outside diameter of electrode—0.20 inch.
　Coating—rutile flux of the type described, below.

The inner flux layer was made up of the following constituents:

| | Percent by weight |
|---|---|
| Asbestos | 26 |
| Cellulose | 26 |
| Ferro-manganese | 8 |
| Potassium-silicate | 40 |

The outer flux layer was made up of the following constituents:

| | Percent by weight |
|---|---|
| Rutile | 37 |
| Feldspar | 13 |
| Ferro-manganese | 15 |
| Cellulose | 1 |
| Potassium silicate | 34 |

The current voltage relationship of the above type of wire as compared to previous single extruded wire is shown in the table below.

|  | Single Extruded Wire | Double Extruded Wire |
|---|---|---|
| Minimum Current_____amps__ | 275 | 225 |
| Maximum Current_____amps__ | 375 | 425 |
| Arc Voltage at Min. Current_____volts__ | 28 | 15 |
| Arc Voltage at Max. Current_____volts__ | 34 | 24 |

We claim:

1. A continuous flexible arc welding electrode, comprising, a first winding of a plurality of wires wound helically with a substantially constant spacing, a second winding of a plurality of wires wound helically with a substantially constant spacing around said first winding in the opposite direction, all said wires being of mild steel and of a diameter within from about .035 to about .078 inch, a first coating of welding flux of a first kind in the interstices of said first winding, and a second coating of welding flux of a second kind in the interstices of said second winding, a portion of at least the outer edges of the wires of said second winding being bare for electrical contact, said first coating being of a volatile-type flux giving off gases on decomposition in the arc, and said second coating being of a mineral-type flux.

2. A continuous flexible arc welding electrode, comprising, a first winding of a plurality of wires wound helically with a substantially constant spacing, a second winding of a plurality of wires wound helically with a substantially constant spacing around said first winding in the opposite direction, all said wires being of mild steel and of a diameter within from about .035 to about .078 inch, a first coating of welding flux of a first kind in the interstices of said first winding, and a second coating of welding flux of a second kind in the interstices of said second winding, a portion of at least the outer edges of the wires of said second winding being bare for electrical contact, said first coating being of a cellulosic-type flux and said second coating being of a rutile-type flux.

3. A continuous flexible arc welding electrode, comprising, a first winding of a plurality of wires wound helically with a substantially constant spacing, a second winding of a plurality of wires wound helically with a substantially constant spacing around said first winding in the opposite direction, all said wires being of mild steel and of a diameter within from about .035 to about .078 inch, a first coating of welding flux of a first kind in the interstices of said first winding, and a second coating of welding flux of a second kind in the interstics of said second winding, a portion of at least the outer edges of the wires of said second winding being bare for electrical contact, said first coating containing from 30% to 90% of dissociable mineral carbonates and said second coating being of a basic type flux.

4. A continuous flexible arc welding electrode, comprising, a first winding of a plurality of wires wound helically with a substantially constant spacing, a second winding of a plurality of wires wound helically with a substantially constant spacing around said first winding in the opposite direction, all said wires being of mild steel and of a diameter within from about .035 to about .078 inch, a first coating of welding flux of a first kind in the interstices of said first winding, and a second coating of welding flux of a second kind in the interstices of said second winding, a portion of at least the outer edges of the wires of said second winding being bare for electrical contact, and said second coating being of a mineral-type flux, at least one of the 2 coatings containing iron powder, forming from 15% to 45% of the total weight of the two coatings.

5. A continuous flexible arc welding electrode, comprising, a first winding of a plurality of wires wound helically with a substantially constant spacing, a second winding of a plurality of wires wound helically with a substantially constant spacing around said first winding in the opposite direction, all said wires being of mild steel and of a diameter within from about .035 to about .078 inch, a first coating of welding flux of a first kind in the interstices of said first winding, and a second coating of welding flux of a second kind in the interstices of said second winding, a portion of at least the outer edges of the wires of said second winding being bare for electrical contact, said first coating being of a volatile-type flux giving off gases on decomposition in the arc, and said second coating being of a mineral-type flux, at least one of the 2 coatings containing a slag volume controlling agent.

6. A continuous flexible arc welding electrode, comprising a first winding of a plurality of wires wound helically with a substantially constant spacing, a second winding of a plurality of wires wound helically with a substantially constant spacing around said first winding in the opposite direction, all said wires being of mild steel and of a diameter within from about .035 to about .078 inch, a first coating of welding flux of a first kind in the interstices of said first winding, and a second coating of welding flux of a second kind in the interstices of said second winding, a portion of at least the outer edges of the wires of said second winding being bare for electrical contact, and said second coating being of a mineral-type flux, the proportion of flux to welding wire on the first layer being from about 8% to about 16% by weight, the proportion of flux to welding wire on the second layer being within the range from about 20% to about 50% by weight.

7. A continuous flexible arc welding electrode, comprising a first winding of a plurality of wires wound helically with a substantially constant spacing, a second winding of a plurality of wires wound helically with a substantially constant spacing around said first winding in the opposite direction, all said wires being of mild steel and of a diameter within from about .035 to about .078 inch, a first coating of welding flux of a first kind in the interstices of said first winding, and a second coating of welding flux of a second kind in the interstices of said second winding, a portion of at least the outer edges of the wires of said second winding being bare for electrical contact, said first coating being of a volatile-type flux giving off gases on decomposition in the arc, and said second coating being of a mineral-type flux, the wires being of a size within the range of .040 inch to about .045 inch in diameter.

8. A continuous flexible arc welding electrode, comprising a first winding of a plurality of wires wound helically with a substantially constant spacing, a second winding of a plurality of wires wound helically with a substantially constant spacing around said first winding in the opposite direction, all said wires being of mild steel and of a diameter within from about .035 to about .078 inch, a first coating of welding flux of a first kind in the interstices of said first winding, and a second coating of welding flux of a second kind in the interstices of said second winding, a portion of at least the outer edges of the wires of said second winding being bare for electrical contact, said first coating being of a volatile-type flux giving off gases on decomposition in the arc, and said second coating being composed of a mineral-type flux, the winding pitch of both layers being about 1.85 times the diameter of the core wire.

9. A continuous flexible arc welding electrode, comprising a core wire, a first layer of 3 wires wound helically with a substantially constant spacing around said core wire, a second layer of 3 wires wound helically with a substantially constant spacing around said first layer in opposite direction, all said wires being of mild steel and of substantially the same diameter, a first coating of welding flux of a first kind in the interstices of said first layer of wires, and a second coating of welding flux of a second kind in the interstices of said second layer of wires, a portion at least of the outer edges of the wires of said second layer being bare for electrical contact, said first coating being of a volatile-type flux giving off gases on decomposition in the arc, and said second coating being of a mineral-type flux.

References Cited in the file of this patent

UNITED STATES PATENTS

| | | |
|---|---|---|
| 1,517,311 | Motte | Dec. 2, 1924 |
| 1,944,753 | Mathias | Jan. 23, 1934 |
| 2,430,701 | Bernard | Nov. 11, 1947 |

FOREIGN PATENTS

| | | |
|---|---|---|
| 707,542 | Great Britain | Apr. 21, 1954 |